(12) United States Patent
Anglin et al.

(10) Patent No.: US 11,293,307 B2
(45) Date of Patent: Apr. 5, 2022

(54) PARTIAL ARC GUTTER FOR GAS TURBINE ENGINE

(71) Applicant: Raytheon Technologies Corporation, Farmington, CT (US)

(72) Inventors: Christopher T. Anglin, Manchester, CT (US); Kaleb Von Berg, Middletown, CT (US); Marios C. Soteriou, Middletown, CT (US); Graham B. Fulton, III, Ellington, CT (US); Shiling Zhang, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 153 days.

(21) Appl. No.: 16/849,562

(22) Filed: Apr. 15, 2020

(65) Prior Publication Data

US 2021/0324762 A1    Oct. 21, 2021

(51) Int. Cl.
*F01D 25/18* (2006.01)
*F01D 11/00* (2006.01)
*F02C 7/06* (2006.01)

(52) U.S. Cl.
CPC ............ *F01D 25/18* (2013.01); *F01D 11/005* (2013.01); *F02C 7/06* (2013.01);
(Continued)

(58) Field of Classification Search
CPC ........ F01D 25/00; F01D 25/18; F01D 25/183; F01D 25/186; F01D 11/00; F01D 11/005; F02C 7/00; F02C 7/06; F05D 2220/00; F05D 2220/30; F05D 2220/31; F05D 2220/32; F05D 2220/321; F05D 2220/3212; F05D 2220/3213; F05D 2220/3215; F05D 2220/3216; F05D 2220/3217; F05D 2220/3218; F05D 2220/3219;
(Continued)

(56) References Cited

U.S. PATENT DOCUMENTS 4,402,514 A    9/1983   Ryan et al.
4,928,978 A *  5/1990   Shaffer ................ F01D 25/183
                                                277/401
(Continued)

FOREIGN PATENT DOCUMENTS

EP    338511 A2    10/1989
EP    3385511 A2   10/2018
(Continued)

OTHER PUBLICATIONS

European Search Report for EP Patent Application No. 21 16 8452 dated Sep. 30, 2021.

*Primary Examiner* — Nathan Cumar
(74) *Attorney, Agent, or Firm* — Carlson, Gaskey & Olds, P.C.

(57) ABSTRACT

A gas turbine engine according to an exemplary aspect of the present disclosure includes, among other things, a bearing compartment, a seal assembly configured to establish a seal of the bearing compartment. The seal assembly includes a seal plate. The gas turbine engine further includes a gutter configured to collect oil slung from the seal plate. The gutter extends only partially around the seal plate. A method is also disclosed.

20 Claims, 3 Drawing Sheets

(52) U.S. Cl.
CPC .... *F05D 2220/323* (2013.01); *F05D 2240/50* (2013.01); *F05D 2240/55* (2013.01); *F05D 2260/40311* (2013.01); *F05D 2260/602* (2013.01); *F05D 2260/98* (2013.01); *F16C 2360/23* (2013.01)

(58) Field of Classification Search
CPC ........... F05D 2220/323; F05D 2240/50; F05D 2240/52; F05D 2240/54; F05D 2240/55; F05D 2260/00; F05D 2260/40; F05D 2260/40311; F05D 2260/602; F05D 2260/6022; F05D 2260/98; F16C 2360/00; F16C 2360/23; F16C 2360/24

USPC ........................................................ 277/408
See application file for complete search history.

(56) References Cited

U.S. PATENT DOCUMENTS

| | | | |
|---|---|---|---|
| 5,593,165 | A | 1/1997 | Murray et al. |
| 9,631,508 | B2 | 4/2017 | Blais et al. |
| 10,174,629 | B1 | 1/2019 | Valva et al. |
| 10,174,635 | B2 | 1/2019 | Walker et al. |
| 2004/0213663 | A1 | 10/2004 | Duerr et al. |
| 2008/0232729 | A1 | 9/2008 | Petitjean et al. |
| 2010/0139270 | A1 | 6/2010 | Koch et al. |
| 2011/0007991 | A1 | 1/2011 | Miller et al. |
| 2016/0003100 | A1* | 1/2016 | Walker .................. F01D 25/16 415/116 |
| 2018/0291960 | A1* | 10/2018 | Anglin ................ F16J 15/3404 |
| 2019/0368416 | A1* | 12/2019 | Baumann ................. F02C 6/12 |

FOREIGN PATENT DOCUMENTS

| | | |
|---|---|---|
| EP | 3647633 A1 | 5/2020 |
| EP | 3667025 A1 | 6/2020 |
| JP | H10339155 A | 12/1998 |
| WO | 2014014791 A1 | 1/2014 |

\* cited by examiner

PARTIAL ARC GUTTER FOR GAS TURBINE ENGINE

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine also includes bearings that support rotatable shafts. The bearings require lubricant. Various seals near the rotating shafts contain oil within bearing compartments, which include bearings and seals. During operation of the engine, the seals maintain compartment pressures and keep lubricating oil inside the various compartments.

SUMMARY

A gas turbine engine according to an exemplary aspect of the present disclosure includes, among other things, a bearing compartment, a seal assembly configured to establish a seal of the bearing compartment. The seal assembly includes a seal plate. The gas turbine engine further includes a gutter configured to collect oil slung from the seal plate. The gutter extends only partially around the seal plate.

In a further non-limiting embodiment of the foregoing gas turbine engine, the gutter is at least partially radially outward of the seal plate.

In a further non-limiting embodiment of any of the foregoing gas turbine engines, the gutter includes an inlet section, a main passageway, and an outlet.

In a further non-limiting embodiment of any of the foregoing gas turbine engines, the inlet section is configured to direct oil slung from the seal plate into the main passageway.

In a further non-limiting embodiment of any of the foregoing gas turbine engines, the inlet section includes at least one vane configured to encourage oil to flow into the main passageway.

In a further non-limiting embodiment of any of the foregoing gas turbine engines, the inlet section has a radially-open cross-section and is concave in cross-section when viewed from an axis of rotation of the seal plate.

In a further non-limiting embodiment of any of the foregoing gas turbine engines, the inlet section includes a first radially-extending wall, a second radially-extending wall spaced-apart from the first radially extending wall, and an axially-extending wall connecting radially-outer ends of first and second radially-extending walls.

In a further non-limiting embodiment of any of the foregoing gas turbine engines, the inlet section is arcuate and follows a radius having an origin about the axis of rotation of the seal plate.

In a further non-limiting embodiment of any of the foregoing gas turbine engines, the inlet section extends circumferentially about the axis of rotation of the seal plate from a first circumferential location to a second circumferential location spaced-apart from the first circumferential location in a direction of rotation of the seal plate.

In a further non-limiting embodiment of any of the foregoing gas turbine engines, the first circumferential location is spaced-apart from the second circumferential location by less than 180°.

In a further non-limiting embodiment of any of the foregoing gas turbine engines, the first circumferential location is spaced-apart from the second circumferential location by about 90°.

In a further non-limiting embodiment of any of the foregoing gas turbine engines, an oil nozzle configured to direct oil onto the seal plate is circumferentially spaced-apart from the first location in a direction opposite the direction of rotation of the seal plate.

In a further non-limiting embodiment of any of the foregoing gas turbine engines, the main passageway begins at the second circumferential location, and the main passageway includes a radially-closed cross-section.

In a further non-limiting embodiment of any of the foregoing gas turbine engines, the main passageway includes a first straight section extending from the second circumferential location to a third location.

In a further non-limiting embodiment of any of the foregoing gas turbine engines, the main passageway includes a curved section between the third location and a fourth location spaced-apart circumferentially from the third location.

In a further non-limiting embodiment of any of the foregoing gas turbine engines, the main passageway includes a second straight section between the fourth location and the outlet.

A method according to an exemplary aspect of the present disclosure includes, among other things, rotating a seal plate of a seal assembly for a bearing compartment of a gas turbine engine, slinging oil from the seal plate, and capturing the oil slung from the seal plate in a gutter extending only partially around the seal plate.

In a further non-limiting embodiment of the foregoing method, the oil slung from the seal plate is captured by an inlet section of the gutter having a radially-open cross-section.

In a further non-limiting embodiment of any of the foregoing methods, the method includes directing oil from the inlet section to a main passageway of the gutter having a radially-closed cross-section.

In a further non-limiting embodiment of any of the foregoing methods, the method includes draining oil out an outlet of the gutter.

DETAILED DESCRIPTION

Figure 1:
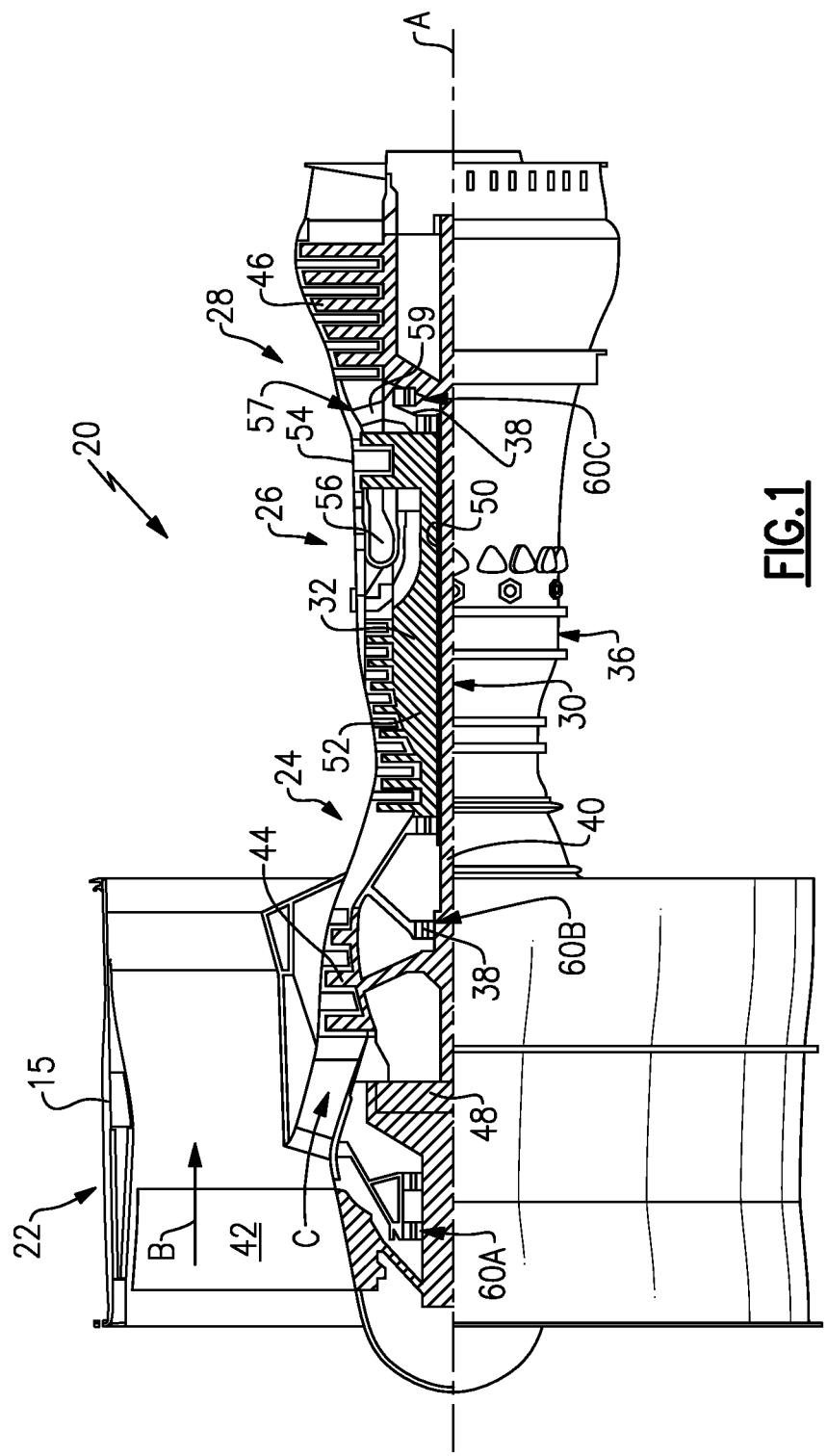
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, low bypass engines, and multi-stage fan engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
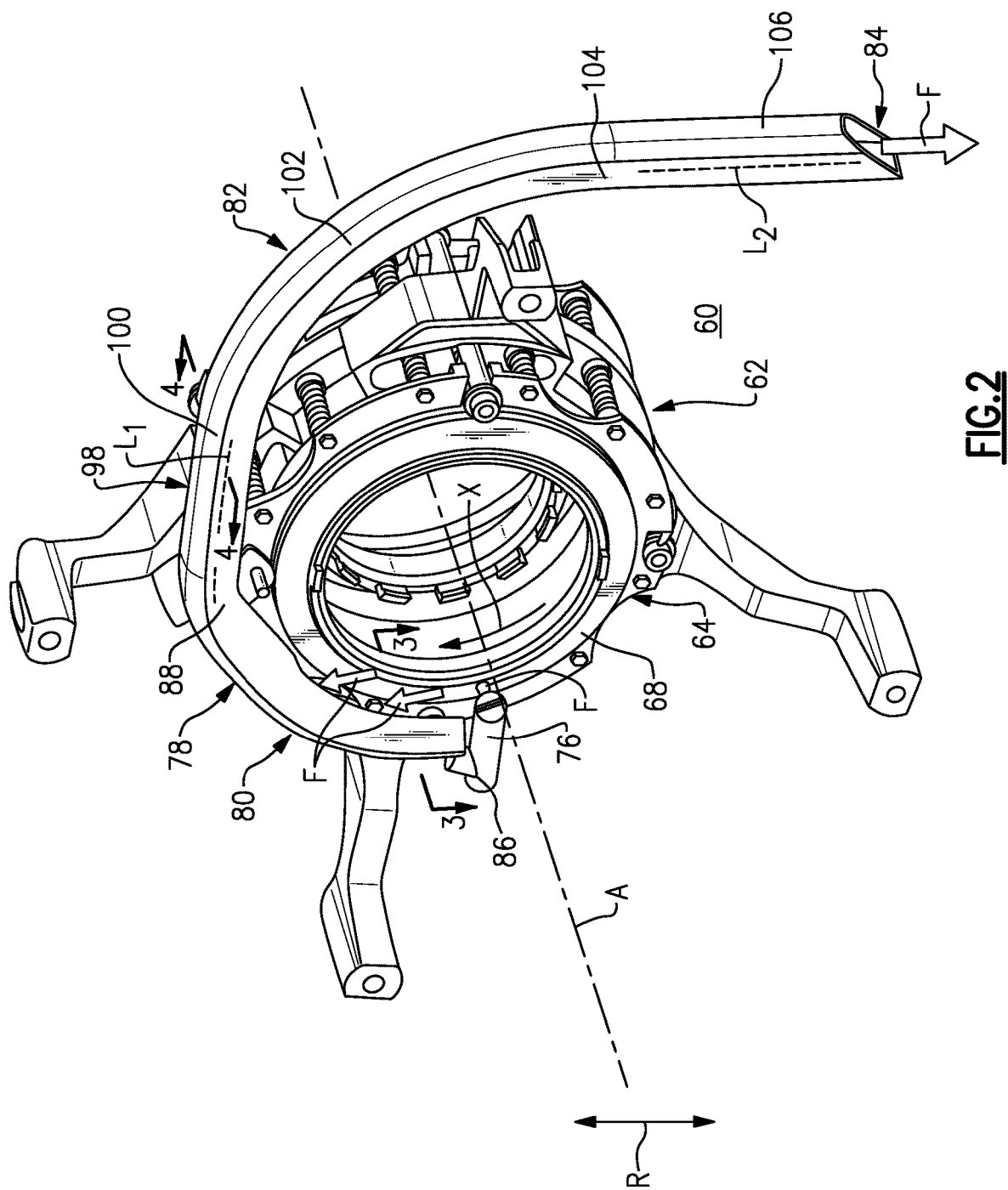
FIG. 2 is a perspective view of a portion of the engine, and in particular illustrates a gutter relative to a seal assembly.

FIG. 2 is a perspective view of various components adjacent and/or within a bearing compartment 60 of the engine 20. Specifically, FIG. 2 illustrates a support assembly 62 and a seal assembly 64 configured to seal the bearing compartment 60 and maintain fluid pressure, particularly oil pressure, in the bearing compartment 60 during operation of the engine 20. As is known in the art, the support assembly 62 may include various seal elements such as a static support, carbon elements, etc. The support assembly 62 is mounted relative to a shaft of the engine 20. In particular, the support assembly 62 may be an inter-shaft seal support connecting one shaft of the engine 20 to another shaft of the engine 20, such as connecting the inner shaft 40 and the outer shaft 50. The support and seal assemblies 62, 64 may be mounted about the engine central longitudinal axis A and act to seal oil in bearing compartment 60 adjacent the inner and/or outer shafts 40, 50, for example. The support and seal assemblies 62, 64 may also be used relative to other bearing compartments in the engine 20.

The bearing compartment 60 is representative of any bearing compartment within the engine 20. Example bearing compartment locations are illustrated at 60A-60C in FIG. 1. This disclosure is not limited to any specific bearing compartment, and in particular is not limited to a forward or an aft bearing compartment. This disclosure is not limited to bearing compartments at any particular engine location. Further, this disclosure applies outside the context of bearing compartments, and extends to other engine compartments that are sealed. This disclosure also extends to other inter-shaft assemblies and to other oil cooled seals.

Figure 3:
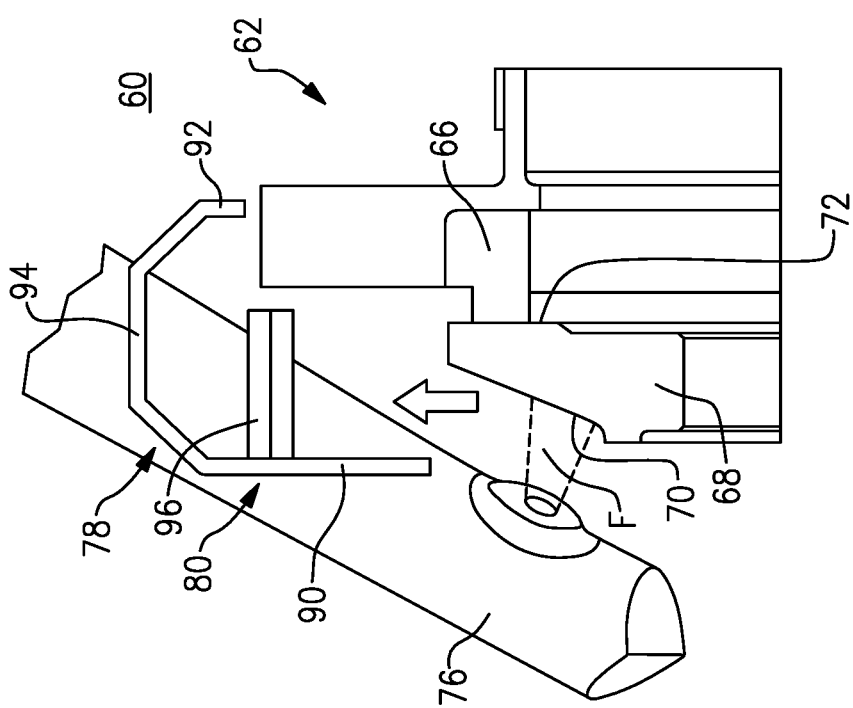
FIG. 3 is a cross-sectional view taken along line 3-3 from FIG. 2, and illustrates an inlet section of the gutter.

With reference to FIG. 3, the seal assembly 64 includes a seal 66, such as a carbon face seal, and a seal plate 68 configured to cooperate with one another to establish a seal for the bearing compartment 60, and in particular to keep oil in the bearing compartment 60 and to maintain oil pressure in the bearing compartment 60. The seal 66 and the seal plate 68 are circular components and extend circumferentially around the engine central longitudinal axis A.

The seal plate 68 includes a first axial face 70 and a second axial face 72 on an opposite axial side of the first axial face 70. The first axial face 70 lies in a plane inclined relative to the engine central longitudinal axis A at an angle between 0° and 90°. The second axial face 72 is in direct contact with the seal 66, in this example, and lies in a plane extending in a radial direction normal to the engine central longitudinal axis A. In this disclosure "axially" refers to a direction substantially parallel to the engine central longitudinal axis A, and "radially" refers to directions normal thereto. The radial direction R is labeled in FIG. 2 for ease of reference.

Figure 4:
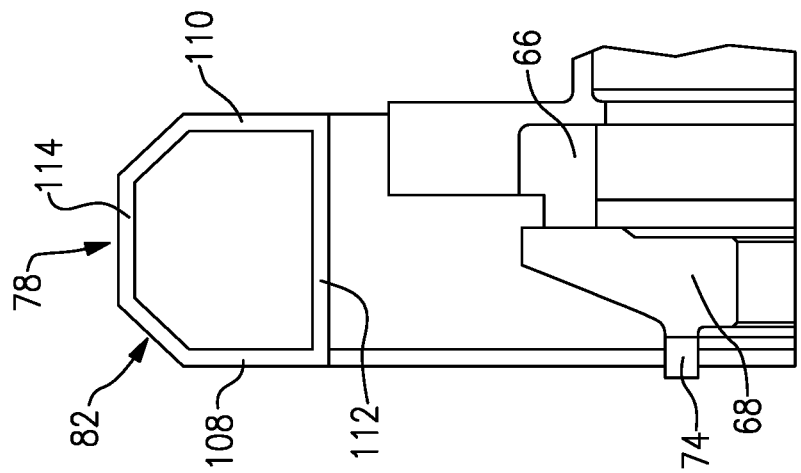
FIG. 4 is a cross-sectional view taken along line 4-4 from FIG. 2, and illustrates a main passageway of the gutter.

In this example, the seal 66 is mounted to a static structure, and therefore does not rotate during operation of the engine 20. The seal plate 68, on the other hand, is configured to rotate about an axis of rotation, which in this example is the engine central longitudinal axis A, during operation of the engine 20. The seal plate 68, in this example, is mechanically connected to a shaft of the engine 20, such as one of the shafts 40, 50, by way of an axially-extending lug 74 (FIG. 4) which projects axially from the first axial face 70.

To cool the seal plate 68, and in turn the seal 66, fluid F, specifically oil, is directed onto the first axial face 70 of the seal plate 68 via one or more nozzles, which here is a single nozzle 76. The nozzle 76 is fluidly coupled to a circuit configured to direct fluid F to the nozzle 76 under pressure, and may include one or more conduits and/or pumps. The nozzle 76 is configured to spray, or jet, the fluid F against the seal plate 68 such that the fluid F impinges against the seal plate 68, and thereby absorbs heat from the seal plate 68 via the first axial face 70. Thus, this arrangement may be referred to as a direct jetted cooling arrangement. While a direct jetted arrangement is shown in FIG. 2, this disclosure is not limited to direct jetted arrangements and extends to arrangements where the seal plate 68 includes internal passageways for the fluid F. However, this disclosure has particular advantages in the context of direct jetting because more fluid F is slung in locations concentrated near the nozzle 76. Further, this disclosure is not limited to seal plates and extends to seal runners as well.

As fluid F is directed onto the seal plate 68, rotation of the seal plate 68 slings (i.e., rejects or flings) the fluid F radially outwardly, away from the engine central longitudinal axis A. The slung fluid F has a velocity with both radial and circumferential components. In this disclosure, the engine 20 includes a gutter 78 configured to collect the slung fluid F and direct it to another location. The gutter 78 may be referred to as a trough. In general, the gutter 78 prevents the slung fluid F from churning or moving around the bearing compartment 60, where it may enter a gear mesh, for example, causing heat generation and reducing engine efficiency. The gutter 78, in this example, is at least partially radially outward of the seal plate 68.

Further, the gutter 78 does not extend around the entire circumference of the seal plate 68. Rather, the gutter 78 extends only partially around the outer circumference of the seal plate 68. Thus, the gutter 78 may be referred to as a partial arc gutter. Despite not extending around the entire outer circumference of the seal plate 68, the gutter 78 is designed and arranged to collect a majority, if not a vast majority, of the slung fluid F. Because the gutter 78 does not extend around the entire outer circumference of the seal plate 68, the gutter 78 has advantages of reducing weight and cost. Further, fluid F collected by the gutter 78 is expelled from gutter 78 relatively faster than if the gutter extended about the entire outer circumference of the seal plate 68, which increases efficiency.

With reference to FIG. 2, the gutter 78 includes an inlet section 80, a main passageway 82, and an outlet 84. The gutter 78 is provided by a single piece of metallic material, in one example. In another example, the gutter 78 is provided by a plurality of pieces of metallic material which are fastened together, such as by welding. The inlet section 80 includes a radially-open cross-section such that the slung fluid F may enter the gutter 78 from a radially inner location. The inlet section 80 is configured to direct fluid F circumferentially into the main passageway 82, which has a radially-closed cross-section configured to retain fluid F therein and direct that fluid F to the outlet 84.

The inlet section 80 extends circumferentially about the engine central longitudinal axis A from a first circumferential location 86 to a second circumferential location 88 spaced-apart from the first circumferential location 86 in a direction of rotation X of the seal plate 68, which, with reference to FIG. 2, is a clockwise direction. By contrast, the nozzle 76 is circumferentially spaced-apart from the first circumferential location 86 in a direction opposite the direction of rotation X of the seal plate 68. The inlet section 80 is arcuate and follows a constant radius having an origin about the engine central longitudinal axis A. Between the first and second circumferential locations 86, 88, the inlet section 80 follows an arc parallel to the circumference of the seal plate 68, in one example. In an example, the first circumferential location 86 is spaced-apart from the second circumferential location 88 by less than 180° relative to the engine central longitudinal axis A. In a further example, such as in the example depicted in FIG. 2, the first circumferential location 86 is spaced-apart from the second circumferential 88 location by about 90°.

In cross-section, the inlet section 80 is radially-open, as mentioned above, and in particular is concave when viewed from the engine central longitudinal axis A. With reference to FIG. 3, within the inlet section 80, the gutter 78 includes a first radially-extending wall 90, a second radially-extending wall 92 axially spaced-apart from the first radially extending wall 90, and an axially-extending wall 94 connecting radially-outer ends of the first and second radially-extending walls 90, 92. In the example of FIG. 3, the first and second radially-extending walls 90, 92 include chamfers or angled sections adjacent their radially-outer ends leading into the axially-extending wall 94. The first and second radially-extending walls 90, 92 could be curved in some examples.

In FIG. 3, the first and second radially-extending walls 90, 92 are of a different dimension. In particular, the second radially-extending wall 92 is shorter in the radial direction than the first radially-extending wall 90. The first radially-extending wall 90 may be radially longer than the second radially-extending wall 92 to permit attachment to one or more mounting structures, such as mechanical fasteners. The first and second radially-extending walls 90, 92 may be of the same dimensions in other examples. In this example, each of the first and second radially-extending walls 90, 92 is radially outward of the seal plate 68. In other examples, the first and second radially-extending walls may be partially radially aligned with the seal plate 68 with the axially-extending wall 94 radially outward of the seal plate 68.

Fluid F entering the gutter 78 via the inlet section 80 tends to flow toward the axially-extending wall 94 and follow the curvature of the inlet section 80 toward the main passageway 82. In an example, the inlet section 80 includes one or more elements configured to encourage fluid F to remain in the gutter 78. In FIG. 3, a vane 96 projects axially from the first radially-extending wall 90 toward the second radially-extending wall 92. The vane 96 may be curved and/or airfoil shaped in cross-section and encourages fluid F to remain in the inlet section 80 and flow toward the main passageway 82. While the vane 96 only extends partially between the first radially-extending wall 90 and the second radially-extending wall 92 in FIG. 3, the vane 96 could span the entire space between and directly contact both the first and second radially-extending walls 90, 92. Instead of a vane, the inlet section 80 may include one or more flaps, scoops, or splitters, as examples. The inlet section 80 does not require such elements in all examples.

With reference back to FIG. 2, the main passageway 82 begins at the second circumferential location 88 and extends to the outlet 84. The main passageway 82 includes a first straight section 98 extending from the second circumferential location 88 to a third location 100. The third location is spaced-apart from the second circumferential location 88 along a first straight line $L_1$ extending normal to both the radial direction R and the axial direction A. The first straight line $L_1$ extends in a direction parallel to a tangent to an arc of the inlet section 80. At the third location 100, the main passageway 82 includes a curved section 102 following a constant radius to a fourth location 104. The curved section 102 is configured such that main passageway 82 makes a substantially 90° turn. Between the fourth location 104 and the outlet 84, the main passageway 82 includes a second straight section 106 extending along a straight line $L_2$. The second straight line $L_2$ extends in a direction parallel to the radial direction R in this example. While a specific configuration of the main passageway 82 has been mentioned, this disclosure extends to other arrangements.

The main passageway 82 includes a radially-closed cross-section, and in a particular example includes first and second radially-extending walls 108, 110 (FIG. 4) axially-spaced apart from one another, a first axially-extending wall 112 connecting radially inner ends of the first and second radially-extending walls 108, 110, and a second axially-extending wall 114 connecting radially outer ends of the first and second radially-extending walls 108, 110. Thus, fluid F within the main passageway 82 is radially and axially bound. The main passageway 82 does not permit fluid F to radially enter the gutter 78, unlike the inlet section 80.

Thus, fluid F that enters the main passageway 82 flows to the outlet 84, where the fluid F is drained out of the outlet 84 and flows toward a scavenge port of the bearing compartment 60. The scavenge port is located at a gravitational bottom, sometimes called a bottom dead center (BDC), of the bearing compartment 60. The outlet 84 is arranged adjacent the gravitational bottom in one example. The fluid F is then recirculated within via a circuit to the nozzle 76.

In another aspect of this disclosure, the gutter 78 may include contoured surfaces configured to interface with corresponding contoured surfaces of the seal assembly 64. In particular, the second radially-extending walls 92, 110 could include rounded radially-extending projections, which may be referred to as scallops, configured to fit within corresponding recesses in the seal assembly 64. The gutter 78 may have another shape configured to fit relative to other parts. Such arrangement may reduce spillage. Further, the width of the gutter 78 may be variable along its length. Additionally, while disclosed in the context of a gas turbine engine, the gutter 78 may have applicability in other contexts.

It should be understood that terms such as "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising:
   a bearing compartment;
   a seal assembly configured to establish a seal of the bearing compartment, the seal assembly including a seal plate; and
   a gutter configured to collect oil slung from the seal plate, wherein the gutter extends only partially around the seal plate.

2. The gas turbine engine as recited in claim 1, wherein the gutter is at least partially radially outward of the seal plate.

3. The gas turbine engine as recited in claim 1, wherein the gutter includes an inlet section, a main passageway, and an outlet.

4. The gas turbine engine as recited in claim 3, wherein the inlet section is configured to direct oil slung from the seal plate into the main passageway.

5. The gas turbine engine as recited in claim 4, wherein the inlet section includes at least one vane configured to encourage oil to flow into the main passageway.

6. The gas turbine engine as recited in claim 4, wherein the inlet section has a radially-open cross-section and is concave in cross-section when viewed from an axis of rotation of the seal plate.

7. The gas turbine engine as recited in claim 5, wherein the inlet section includes a first radially-extending wall, a second radially-extending wall spaced-apart from the first radially extending wall, and an axially-extending wall connecting radially-outer ends of first and second radially-extending walls.

8. The gas turbine engine as recited in claim 5, wherein the inlet section is arcuate and follows a radius having an origin about the axis of rotation of the seal plate.

9. The gas turbine engine as recited in claim 7, wherein the inlet section extends circumferentially about the axis of rotation of the seal plate from a first circumferential location to a second circumferential location spaced-apart from the first circumferential location in a direction of rotation of the seal plate.

10. The gas turbine engine as recited in claim 9, wherein the first circumferential location is spaced-apart from the second circumferential location by less than 180°.

11. The gas turbine engine as recited in claim 10, wherein the first circumferential location is spaced-apart from the second circumferential location by about 90°.

12. The gas turbine engine as recited in claim 9, wherein an oil nozzle configured to direct oil onto the seal plate is circumferentially spaced-apart from the first location in a direction opposite the direction of rotation of the seal plate.

13. The gas turbine engine as recited in claim 9, wherein:
   the main passageway begins at the second circumferential location, and
   the main passageway includes a radially-closed cross-section.

14. The gas turbine engine as recited in claim 13, wherein the main passageway includes a first straight section extending from the second circumferential location to a third location.

15. The gas turbine engine as recited in claim 14, wherein the main passageway includes a curved section between the third location and a fourth location spaced-apart circumferentially from the third location.

16. The gas turbine engine as recited in claim 15, wherein the main passageway includes a second straight section between the fourth location and the outlet.

17. A method, comprising:
   rotating a seal plate of a seal assembly for a bearing compartment of a gas turbine engine;
   slinging oil from the seal plate;
   capturing the oil slung from the seal plate in a gutter extending only partially around the seal plate.

18. The method as recited in claim 17, wherein the oil slung from the seal plate is captured by an inlet section of the gutter having a radially-open cross-section.

19. The method as recited in claim 18, further comprising directing oil from the inlet section to a main passageway of the gutter having a radially-closed cross-section.

20. The method as recited in claim 19, further comprising draining oil out an outlet of the gutter.

\* \* \* \* \*